Oct. 11, 1932.      M. G. JEWETT      1,881,631

HIGH SPEED CHAIN AND METHOD OF MAKING SAME

Filed April 9, 1930      3 Sheets-Sheet 1

INVENTOR
*Maurice G. Jewett,*
BY *Barker+Collings*
ATTORNEYS

Oct. 11, 1932.  M. G. JEWETT  1,881,631
HIGH SPEED CHAIN AND METHOD OF MAKING SAME
Filed April 9, 1930  3 Sheets-Sheet 2
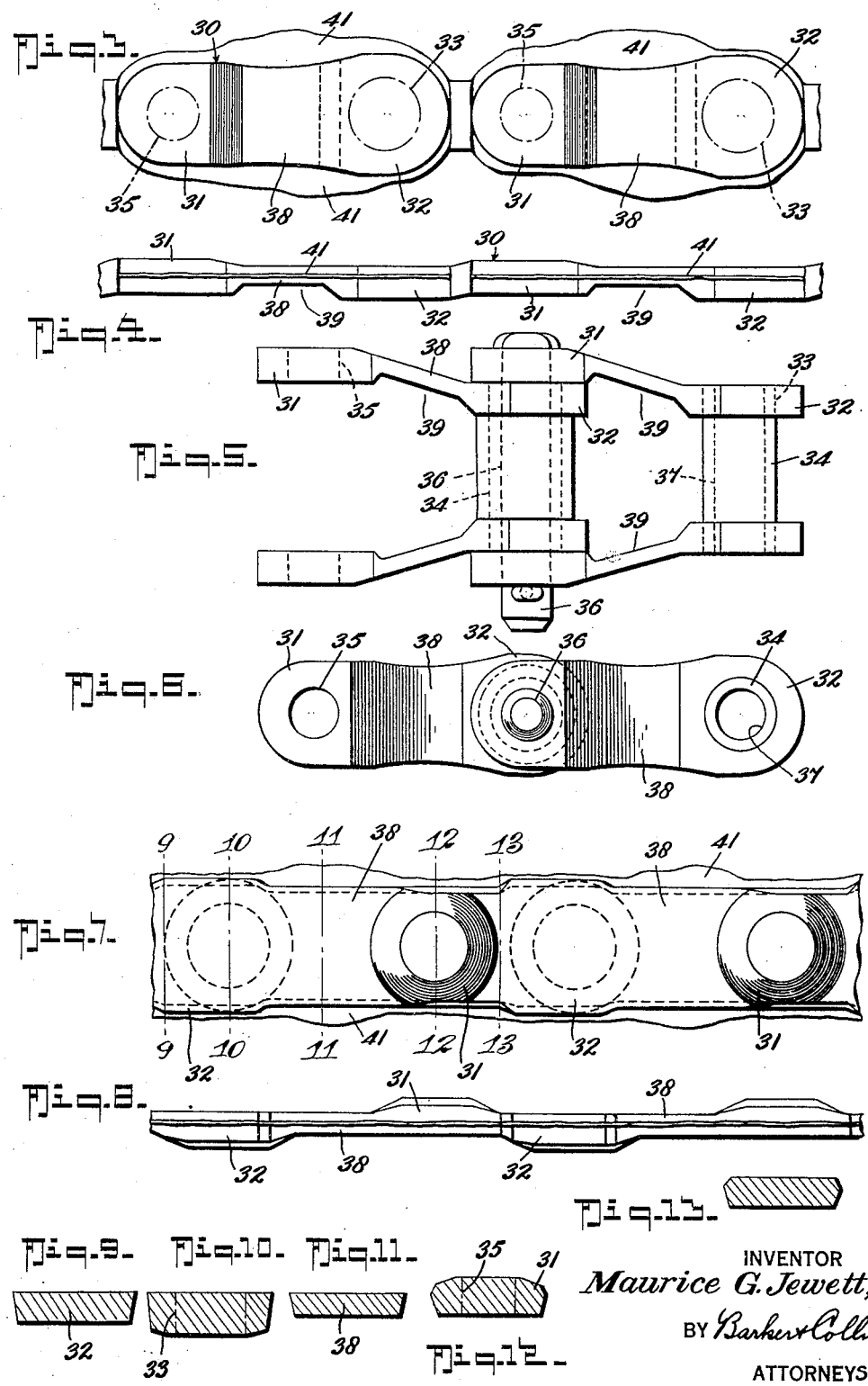
INVENTOR
Maurice G. Jewett,
BY Barker+Collings
ATTORNEYS Oct. 11, 1932.   M. G. JEWETT   1,881,631
HIGH SPEED CHAIN AND METHOD OF MAKING SAME
Filed April 9, 1930   3 Sheets-Sheet 3

INVENTOR
Maurice G. Jewett,
BY Barker & Collins
ATTORNEYS

Patented Oct. 11, 1932

1,881,631

UNITED STATES PATENT OFFICE

MAURICE G. JEWETT, OF MILWAUKEE, WISCONSIN, ASSIGNOR TO CHAIN BELT COMPANY, OF MILWAUKEE, WISCONSIN, A CORPORATION OF WISCONSIN

HIGH SPEED CHAIN AND METHOD OF MAKING SAME

Application filed April 9, 1930. Serial No. 442,936.

This invention relates to sprocket chains, and more particularly to chains of the fabricated type in which spaced side bars are pivotally connected by means of transverse chain pins and bushings, and has for one of its objects to produce a chain of this type which is more efficient at high speeds than those which have been heretofore proposed. The invention also relates to a method of producing such a high speed chain and has for a further object the provision of a method whereby the side bars may be expeditiously produced at a material saving in time and cost.

In order that the exact nature of the invention may be better understood it may be said that various methods have been heretofore proposed for making chain belts which are employed in conveying material and the transmission of power. Where the service required of the chain is relatively light it has been common practice to make the individual links of the chain in the form of castings; however, when the service required of the chain is more severe, as where the chains are operated at comparatively high speeds, for example in oil well drilling, it has been customary to make the individual links in the form of fabricated units consisting of spaced side bars which are connected at one end by transverse bushings pressed into or otherwise secured to the side bars, through which bushings the chain pins pass by means of which the link is connected to the open end of the next adjacent link. Ordinarily anti-friction rollers are mounted upon the bushings in order to minimize wear upon the parts as the chain passes around the sprockets.

The usual method of making chain side bars of this type is to cut pieces of suitable length from a long bar of steel which is of the same width as the finished side bar, then to round the ends of these rectangular pieces and to punch holes of suitable diameter adjacent each end of the blank, into which holes the above mentioned bushings may be pressed and into which the chain pins may be inserted. To take out the unnecessary weight in the side bar, portions of the blank have been cut away along the edges intermediate the ends of the blank. This results in a side bar comprising an elongated piece of metal of uniform thickness, the end portions of which are of greater width than the center section.

While chains of this construction have been found to be fairly satisfactory in oil well drilling where they are subjected to relatively high speeds, it has been found that their performance may be improved and their life materially increased if the metal of the side bars is redistributed in such a manner as to produce thicker end portions and relatively thinner center portions so that the cross-sectional area and strength of the metal in the side bars is substantially uniform throughout, or in other words, that the cross-sectional area and strength of the metal in the thinner and narrower mid portion is equal to the cross-sectional area and strength of the metal through the eyes formed in the thicker and wider end portions. This increase in strength and the consequent life of the chain is further enhanced if the side bars are formed by a rolling action wherein a leader or bar of metal stock of less width and greater thickness than the finished side bar is subjected while in heated condition to the action of rolling dies whereby the metal of the bar stock is redistributed to provide the above mentioned thickened and widened end portions and the thinner and narrower mid-portions, since such rolling operation if carried on while the metal is at substantially a red heat, tends to place the fibers of the metal longitudinally of the side bar which is in the direction of the tensile strain or pull in the finished chain link.

The invention, therefore, contemplates the production of side bars for high speed chain belts by passing a rough strip or leader of steel which has been raised to a red heat through the dies of a suitable rolling mill of any approved type whereby the metal of the said leader is caused to flow or to be redistributed in such a manner as to provide side bar links, the end portions of which are wider than was the original leader and the mid-portions of which are thinner than was the said leader.

With the above and other objects in view which will appear as the description proceeds, the invention consists in the novel chain and side bar, and in the novel steps and combinations of steps constituting the method of producing the said side bars, all as will appear more fully below and be particularly pointed out in the appended claims.

Referring to the accompanying drawings forming a part of this specification in which like reference characters designate like parts in all the views:—

Figure 3 is an enlarged plan view of a portion of the leader after it has passed through the dies, showing two of the side bar blanks;

Figure 4 is an edge elevational view of the blank shown in Figure 3;

Figure 5 is a plan view of a portion of a finished chain made from the bars shown in Figs. 3 and 4;

Figure 6 is a side elevational view of the chain shown in Figure 5;

Figure 7 is a view similar to Figure 3 illustrating a somewhat modified form of side bar;

Figure 8 is an edge elevational view of the blanks shown in Figure 7;

Figure 14:
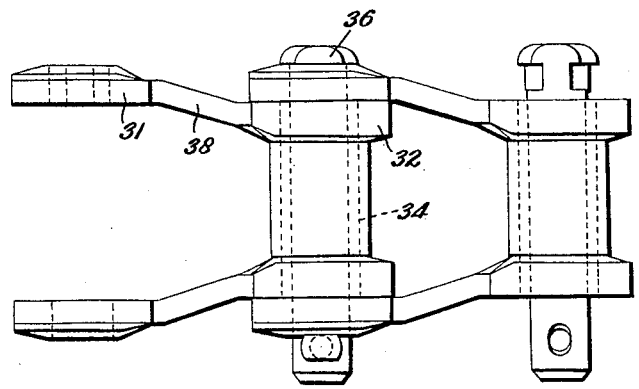
Figure 15:
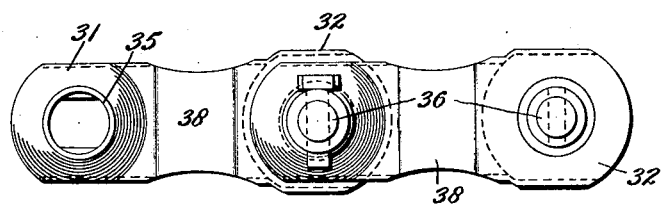
Figure 16:
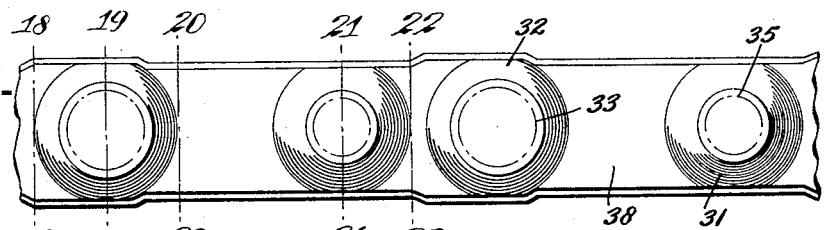
Figure 17:
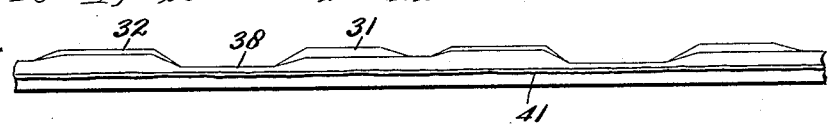
Figure 18:
Figure 20:
Figure 22:
Figure 19:
Figure 21:
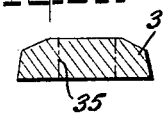

Figures 9, 10, 11, 12 and 13 are cross-sectional views taken respectively on the planes indicated by the lines 9—9, 10—10, 11—11, 12—12 and 13—13 of Figure 7, illustrating the manner in which the cross sectional area and strength of the metal is maintained substantially uniform in both the mid-portion of the link and through the eye portion thereof;

Figures 14 and 15 are views similar to Figures 5 and 6 of a finished chain constructed from the blanks shown in Figures 7 and 8;

Figure 16 is a view similar to Figure 3 of a still further modified form of a side bar blank;

Figure 17 is an edge view of the blank shown in Figure 16; and

Figures 18, 19, 20, 21 and 22 are cross-sectional views taken approximately on the planes indicated by the lines 18—18, 19—19, 20—20, 21—21 and 22—22 of Figure 16.

Referring more particularly to the form shown in Figures 1 to 6 inclusive, a leader or bar 25 of metal stock such as steel is heated to a red heat and then passed through the die rolls 26 and 27 which are provided with suitable matrices 28 and 29 to produce the side bar links 30. As will be clear from Figs. 1 to 4 inclusive, these said blanks comprise the end sections 31 and 32 which are each wider than is the original bar 25 with the end section 32 preferably being somewhat wider than the end section 31 since the said section 32 must be provided with an aperture 33 to receive the chain pin bushing 34, while the end section 31 need only be provided with an aperture 35 which is of sufficient diameter to receive the chain pin 36, which pin, of course, passes through the bore 37 of the bushing 34 of the next adjacent link as will be readily understood. The apertures 35 are of course of less diameter than the apertures 33 and it is therefore desirable that the end 31 be slightly narrower than the end 32 in order that metal may be saved and that the finished chain may be lightened as much as possible consistent with the required strength in order to minimize the effects of centrifugal force as the chain passes around the sprockets.

The mid-portion 38 of the side bars is preferably somewhat narrower than either of the end portions 31 or 32, although this said mid-portion is still somewhat wider, or at least as wide as the original bar or leader 25. The narrowing of the mid portion is preferably accomplished by forming the edges thereof upon arcs of a circle as clearly shown in Figs. 2 and 3, whereby additional metal is saved and the chain bars further lightened.

Figure 1:
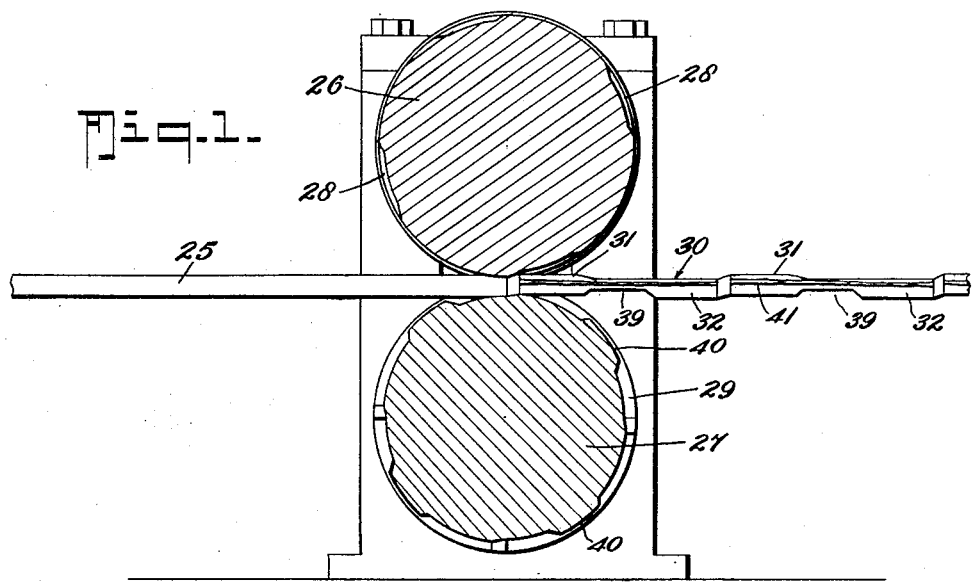
Figure 1 is a diagrammatic vertical sectional view of a pair of rolls or dies, indicating the manner in which the stock bar or leader is rolled to produce the side bars which constitute a portion of the present invention.

As will be clear from Figs. 1 and 4 the end portions 31 and 32 of the side bars are made relatively thick being of nearly the same thickness as was the original bar or leader 25. The mid-portion 38 however is lightened by reducing the thickness thereof by means of an indentation 39 formed therein by means of suitable projections 40 in the die roll 27.

In the operation of rolling the side bars as above described a certain relatively small portion of the metal of the bar or leader 25 is unavoidably extruded beyond the limits of the matrices 28 and 29 of the rolls to form a fin or flashing 41, which extends in a varying width substantially completely around each side bar blank. This fin or flashing may be trimmed from the blanks after they leave the rolls, either before or during the operation in which the apertures 33 and 35 are punched in the said blanks. During this same operation, which may be performed by suitable dies, the blanks may be bent or offset to bring the end portions 32 out of alinement with the end portions 31 whereby the side bars assume the form shown in Figs. 5 and 6.

Figure 2:
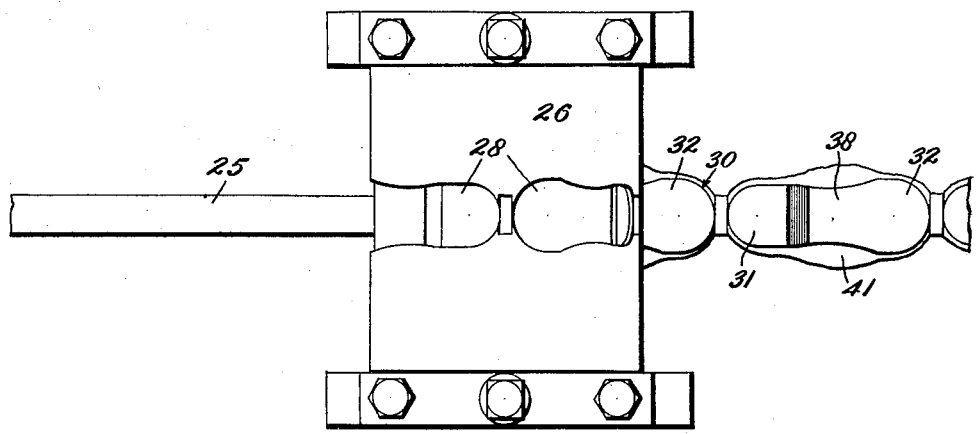
Figure 2 is a diagrammatic plan view of the parts shown in Figure 1.

The die rolls 26 and 27 may be employed for severing the individual blanks as they are formed or the blanks may issue from the said rolls in the form of continuous strips in the manner indicated in Figs. 2 and 3, in which form they may be transported or otherwise handled prior to the finishing operations of punching the holes and bending the bars. In this latter event the individual bars will be severed prior to or during the operation of trimming the fin or flashing 41, punching the holes 33 and 35 and bending the links to the form shown in Fig. 5.

The form of side bar shown in Figs. 7 to 15 inclusive, is analogous to that shown in the preceding figures except that the thickened end portions 31 and 32 are disposed upon opposite sides of the center line of the side bar when viewed along its edge as in Fig. 8. The steps in the method of producing this form may be the same as those described in connection with the preceding form, the only difference being in the particular design given to the matrices in the rolls 26 and 27. It will be clear from the cross-sectional views shown in Figs. 9, 10, 11, 12 and 13 that the cross-sectional area of the metal through the eye of the end portions 31 and 32 after the holes are punched is substantially equal to that through the mid-portion 38 whereby the strength of the side bar is maintained substantially uniform throughout. In these said cross-sectional views, although they are indicated as being taken upon the various planes of the unfinished blank shown in Fig. 7, it has been assumed that the fin or flashing 41 has been trimmed and the holes 33 and 35 are indicated in broken lines.

The form shown in Figures 16 to 22 inclusive, is substantially the same as that shown in Figs. 7 to 15 inclusive, except that the bosses which provide the thickened end portions 31 and 32 are in this form provided upon the same face of the blank. This will produce a chain which may be used in certain connections.

It is therefore obvious that those skilled in the art may vary the precise shape and other similar structural details of the side bars, as well as the precise steps constituting the method of producing the same, without departing from the spirit of the invention, and therefore it is not wished to be limited to the above disclosure except as may be required by the claims.

What is claimed is:

1. A rolled metal side bar for high speed power transmission chains, formed from a die shaped blank having widened and thickened end portions and a narrower, thinner mid portion, the fibers of the metal being disposed longitudinally of the bar.

2. A rolled steel side bar for high speed power transmission chains, having widened and thickened end portions provided with apertures, and a narrower thinner mid portion, the cross sectional area and strength of the metal in said blank being substantially uniform throughout and the fibers of the metal being disposed longitudinally of the bar.

3. A side bar for high speed power transmission chains, formed from a blank rolled from strip steel to have widened and thickened end portions and a narrower thinner mid portion, said end portions being provided with pin and bushing apertures, the cross sectional area and strength of the metal in the end portions being substantially equal to that in the mid portion, and the fibers of the metal being arranged longitudinally of the bar by the rolling action.

4. A high speed power transmission sprocket chain comprising pintle connected rolled steel side bars having widened and thickened end portions and narrower thinner mid portions, the cross sectional area and strength of the metal in said bars being substantially uniform throughout and the fibers of the metal being disposed longitudinally of the bars.

5. The method of forming side bars for high speed power transmission chains, which consists in subjecting a bar of metal stock of substantially uniform cross sectional area to rolling die action to cause a redistribution of the metal to produce a side bar the end portions of which are thicker than its mid portion, the fibers of the metal of which are disposed longitudinally thereof.

6. The method of forming side bars for high speed power transmission sprocket chains which consists in rolling a bar of metal stock of less width and greater thickness than the finished side bars to cause a redistribution of the metal to produce a side bar the end portions of which are wider and thicker than its mid portion and the fibers of the metal of which are disposed longitudinally of the bar.

7. A die shaped side bar for power transmission chains comprising a blank rolled from red-hot metal, whereby the fibers of the metal are placed in a longitudinal direction in the finished blank.

In testimony whereof I affix my signature.

MAURICE G. JEWETT.